(12) United States Patent
Hasek

(10) Patent No.: US 10,659,843 B2
(45) Date of Patent: May 19, 2020

(54) CONTENT RIGHTS MANAGEMENT FOR MOBILE DEVICES

(71) Applicant: Layer3 TV, Inc., Denver, CO (US)

(72) Inventor: Charles Hasek, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/001,655

(22) Filed: Jun. 6, 2018

(65) Prior Publication Data

US 2018/0359529 A1    Dec. 13, 2018

Related U.S. Application Data

(60) Provisional application No. 62/516,871, filed on Jun. 8, 2017.

(51) Int. Cl.

| | |
|---|---|
| *H04N 21/4627* | (2011.01) |
| *H04N 21/4623* | (2011.01) |
| *H04N 21/45* | (2011.01) |
| *H04N 21/258* | (2011.01) |
| *H04N 21/254* | (2011.01) |
| *H04N 21/414* | (2011.01) |
| *H04N 21/6547* | (2011.01) |
| *H04N 21/239* | (2011.01) |

(Continued)

(52) U.S. Cl.
CPC ..... *H04N 21/4627* (2013.01); *H04N 21/2396* (2013.01); *H04N 21/2541* (2013.01); *H04N 21/25816* (2013.01); *H04N 21/25875* (2013.01); *H04N 21/41407* (2013.01); *H04N 21/4524* (2013.01); *H04N 21/4623* (2013.01); *H04N 21/6547* (2013.01); *H04N 21/835* (2013.01); *H04N 21/47202* (2013.01)

(58) Field of Classification Search
CPC ............ H04N 21/4627; H04N 21/835; H04N 21/2396; H04N 21/41407; H04N 21/25875; H04N 21/25816; H04N 21/2541; H04N 21/6547; H04N 21/4524; H04N 21/4623; H04N 21/47202
See application file for complete search history.

(56) References Cited

U.S. PATENT DOCUMENTS

| 9,503,849 B1* | 11/2016 | Gavade | H04W 4/021 |
|---|---|---|---|
| 2004/0253942 A1* | 12/2004 | Mowry | G06F 21/10 |
| | | | 455/410 |

(Continued)

*Primary Examiner* — Hai V Tran
(74) *Attorney, Agent, or Firm* — Brownstein Hyatt Farber Schreck, LLP

(57) ABSTRACT

An electronic device for providing geolocation independent content rights management includes a non-transitory storage medium and a processing unit. The processing unit executes instructions stored in the non-transitory storage medium to receive a request for content from a content access device and, if the content access device is registered to an account associated with a geolocation, provides access to the content. In some implementations, the processing unit may determine if the content access device is registered using a token corresponding to the request. In various implementations, the processing unit may verify that one or more digital rights management and/or persistence policies allow the access, such as where access may be provided to one copy of the content at a time.

20 Claims, 9 Drawing Sheets

(51) Int. Cl.
*H04N 21/835* (2011.01)
*H04N 21/472* (2011.01)

(56) References Cited

U.S. PATENT DOCUMENTS

| | | | |
|---|---|---|---|
| 2006/0015580 A1* | 1/2006 | Gabriel | H04N 21/2541 |
| | | | 709/219 |
| 2012/0174150 A1* | 7/2012 | Reddy | H04N 21/25841 |
| | | | 725/31 |
| 2013/0041991 A1* | 2/2013 | Wang | G06F 21/10 |
| | | | 709/223 |
| 2013/0117775 A1* | 5/2013 | Perry, II | H04L 65/4076 |
| | | | 725/14 |
| 2013/0167253 A1* | 6/2013 | Seleznev | G06F 21/10 |
| | | | 726/29 |
| 2014/0283120 A1* | 9/2014 | Mao | G06F 21/6218 |
| | | | 726/28 |

* cited by examiner

CONTENT RIGHTS MANAGEMENT FOR MOBILE DEVICES

CROSS-REFERENCE TO RELATED APPLICATION(S)

This application is a nonprovisional patent application of and claims the benefit of U.S. Provisional Patent Application No. 62/516,871, filed Jun. 8, 2017 and titled "Geolocation Independent Content Rights Management," the disclosure of which is hereby incorporated by reference herein in its entirety.

FIELD

The described embodiments relate generally to content rights management. More particularly, the present embodiments relate to dynamically verifying content access devices and/or policies and rules for an account user so as to allow content access that may be independent of a geolocation.

BACKGROUND

Content providers (such as cable or satellite providers) may allow users to access content via one or more content access devices. Such content may include television programs, movies, music, video files, on-demand content, and/or or any other kind of content. Such content access devices may include set top boxes, digital video recorders, computing devices, and the like.

In some cases, the content provider may not own at least a part of the content they provide. The content may instead be owned by a content owner. As such, the content provider may have various obligations to the content owner regarding what users the content provider may allow to access the content, what such users may be allowed to do with the content, and so on.

Many content providers may handle their obligations to content owners using geolocation content rights management. Essentially, the content provider may provide the user content via a specific content access device at a particular geolocation. Geolocation content rights management may enable content providers to fulfill contractual obligations to content owners with respect to content, control content owned by the content providers themselves, and so on.

SUMMARY

The present disclosure relates to content rights management that may be independent of the geolocation. A content provider may receive a request from a content access device. The content provider may determine whether the content access device is registered to an account associated with a geolocation or not. If so, the content provider may provide access to the requested content. In this way, content providers may restrict content to geolocations while allowing users to access content using content access devices in various geolocations.

In some embodiments, an electronic device for providing geolocation independent content rights management includes a non-transitory storage medium and a processing unit. The processing unit executes instructions stored in the non-transitory storage medium to receive a request for content from a content access device and, if the content access device is registered to an account associated with a geolocation, provide access to the content.

In various implementations, the processing unit receives a registration request indicating the content access device, identifies the account, and registers the content access device to the account. In some examples of such implementations, the processing unit receives the registration request based on communication between the content access device and an additional content access device already associated with the account. In various examples of such implementations, the processing unit receives the registration request from the additional content access device.

In numerous implementations, the processing unit transmits a token to the content access device as part of registering the content access device to the account. In various implementations, the account is a content provider subscription account. In some implementations, the content is on-demand video content.

In various embodiments, an electronic device for providing geolocation independent content rights management includes a non-transitory storage medium and a processing unit. The processing unit executes instructions stored in the non-transitory storage medium to receive a request for content from a content access device, the request including a token; verify the token indicates the content access device is registered to an account associated with a geolocation; and, if a digital rights management policy indicates the account is allowed to access the content, provide access to the content.

In some examples, the processing unit receives the token from the content access device. In numerous examples, the processing unit retrieves the token from the non-transitory storage medium using an indicator transmitted by the content access device.

In various examples, the digital rights management policy specifies obligations a provider of the content owes to an owner of the content. In numerous examples, the token is encrypted. In some examples, the content is broadcast video content. In various examples, the access to the content is provided by pulling one or more adaptive bit rate segments.

In numerous embodiments, an electronic device for providing geolocation independent content rights management includes a non-transitory storage medium and a processing unit. The processing unit executes instructions stored in the non-transitory storage medium to receive a request for content from a content access device; determine whether the content access device is registered to an account associated with a geolocation; and, if digital rights management and persistence policies indicate the account is allowed to access the content, provide access to one copy of the content at a time. In some implementations, the digital rights management and persistence policies restrict access to the content based on geolocations including the geolocation.

In various implementations, the processing unit revokes access to the content by the content access device before allowing an additional request for the content from an additional content access device registered to the account. In some implementations, the processing unit denies an additional request for the content from an additional content access device registered to the account if access to the content by the content access device has not yet been revoked. In numerous implementations, the processing unit provides access to the content by the content access device when the content access device is located other than at the geolocation. In various implementations, the processing unit provides access to the content by the content access device independent of a location of the content access device.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
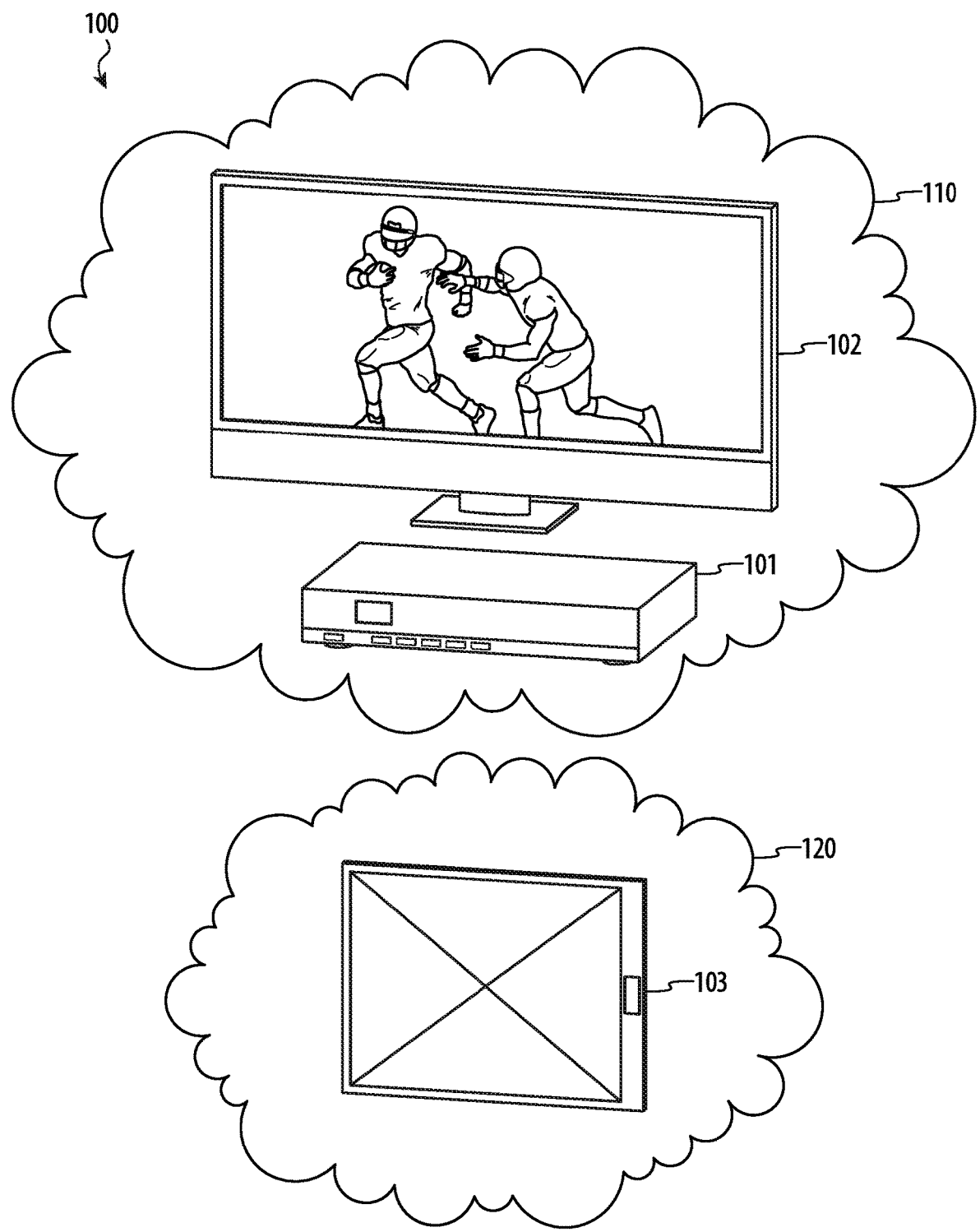
FIG. 1 depicts example content access devices in a first example content access system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The following disclosure relates to content rights management in a content provider network that is independent of the geolocation of content access devices used to access content. A content provider may receive a request for content from a content access device and determine whether or not the content access device is registered to an account associated with a geolocation. If so, the content provider may provide access. In this way, users may be able to use devices to access content allowed to their account in a way that may be independent of geolocation while content providers may be able to ensure geolocation restrictions for content are observed. This may provide a more flexible system for users while allowing content providers to fulfill obligations to content owners and/or otherwise control provided content.

In some implementations, the request may involve a token and the content provider may verify that the token indicates that the content access device is registered to an account associated with the geolocation. Such a token may be provided to the content access device, such as during registration, and subsequently transmitted along with requests. In such examples, the token may be encrypted and/or otherwise configured to prevent forgery. In other examples, the token may be stored by the content provider and may be created when the content access device is registered, retrieved using an indicator (such as an identifier associated with the user, the account, the content access device, and the like) transmitted with the request, and so on.

In various implementations, the content provider may evaluate the request (such as the requested content, the content access device, the geolocation, the user, and so on) based on one or more digital rights management policies and/or persistence policies. These digital rights management policies and/or persistence policies may specify who may be allowed to access what content, what they may do with the content, the circumstances under which they may access the content and/or various actions they may perform with respect to the content, and so on. For example, the content provider may comply with such policies in order to provide access to only one copy of the content at a time.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present disclosure, and are not to be considered as a limitation thereto. The term "means" preceding a present participle of an operation indicates a function for which there is one or more embodiments, i.e., one or more methods, devices, or apparatuses for achieving the function and that one skilled in the art could select from these or their equivalent in view of the disclosure herein and use of the term "means" is not intended to be limiting.

As used herein the term "video on demand" or "VOD" "subscription video on demand" or "SVOD" refers to a system that allows a user and/or subscriber to view programming and/or media content in real time or to download the media content for later viewing. "Subscription video on demand" or "SVOD" refers to other forms of video on demand services that require a user to pay a monthly fee to access a bundle set of media content. Another subset of video on demand is "advertising video on demand" that is often free for users and the platforms rely on selling advertisements as the main revenue stream, for example, Hulu™.

As used herein the term "content" refers to media as well as information and experiences that provides value for a user (i.e., what the end-user derives value from), for example, the specific context in which the information is provided through the medium, the way in which the information is presented, and any features included in the medium in which that information is delivered. Content can be delivered via many different media including, but not limited to, the internet, television, motion picture, audio, books, magazines, live events, text, tweets, such as conferences and stage performances, etc.

As used herein the term "encoder" refers to content files and/or streams (linear or VOD stream) into a predetermined displayable format. Encoding can encode the content transforming from one source format to one or more other output formats, e.g., taking an HBO stream (MPEG-2, 4, AVC) to another format such as HEVC AVC or both at the same time in these various formats. Encoding of a linear or VOD stream may be needed to reduce the size of the source feed (satellite, fiber, direct linear source, Internet Protocol—IP, and VOD), e.g., reducing 1.2 GB to 600 Mbps. Encoding also is useful to ingest the original content and convert to various standard encoding algorithms and formats for video, audio and other content, e.g., JPEG 2K standard, AVC-I and for a particular display (i.e., size and resolution).

As used herein the term "device" refers to any device usable to access content including mobile computing devices, smartphones, tablets, laptop computing devices, set top boxes, displays, desktop computing devices, wearable devices, televisions, and the like.

As used herein the term "set top box" "gateway" or "client" refers to a device that converts video content to analog or digital TV signals viewing on a device, monitor or television (TV), which include "gateway", "client" or "media hubs" that connect to the home network for Internet access and convert video from Netflix™, Hulu™, and other providers into TV signals and includes a "satellite TV set-top box" or "satellite receiver" and that converts over-the-air digital broadcasts for viewing on the subscriber's device, monitor or television (TV).

As used herein the term "digital rights management" or "DRM" refers to software and/or hardware in the CDN system utilized to control the use and viewing of digital content according to various rights and policies concerning or regarding the content as outlined by the content owner according to the sale or license thereof.

As used herein the term "fiber direct" refers to direct linear and fiber connect high bit rate streams.

As used herein the term "linear" "linear TV" or "traditional television" refers to content or television service where the viewer has to watch a scheduled TV program at the particular time it's offered, and on the particular channel it's presented on.

As used herein the term "nonlinear TV", "nonlinear programming", "video on demand" or "VOD" refers to an advanced, non-traditional way of presenting television, content and live broadcast programming and, in many ways, the opposite of linear TV including editing and storage of audio, video and other data, whereby content and data can be brought up from the media (e.g., a CD, computing device disk, digital video recorders (DVRs), video cassette recorders (VCRs)) without having to know physically where it was entered onto that medium.

As used herein the term "rights" refers to digital terms for the copying and use of copyrightable content. Currently the two rights expression languages in use are the MPEG Right Expression Language (MPEG REL) and the Open Digital Rights Language (ODRL), both XML-based computer languages. ODRL utilizes rights terminology like "excerpt," "install," "lend," "modify," "play" and "sell." It also sets forth constraints ("fixed amount," "interval" and "range") and defines payments ("feeType," "prepay" and "postpay").

Systems for providing media content to a subscriber in a content delivery network (CDN) may impose policy and rule based restrictions on the viewing, playback, recording and operability of the subscription service (i.e. cable TV, Satellite TV, etc.) based on the subscriber's current location. Content owners may establish persistent rights management (PRM) policies that place constraints on the capabilities of conventional reseller, cable, satellite, VOD, SVOD, AVOD systems such as, for example, locking a file format to a specific hardware/software platform. In such cable and satellite TV systems, operators of the systems may lock the viewing and persistence of a copy of the media content to the specific hardware and/or location of the hardware (such as a user's home). These PRM policies may restrict the subscriber to viewing content based on a location of the set-top box and/or filter based on geolocation restrictions. However, subscribers could become frustrated if they cannot watch media content anywhere, on-demand, as they may feel they should be able to because they are already paying for a service to access and view the media content.

Geolocation blocking or geoblocking is a tool to enforce obligations in the video on demand industry between the content owner and the provider, or reseller. Content owners (i.e. studios, Hollywood, Sony Pictures™, etc.) may have a content protection agreement with resellers (i.e. Netflix™, Hulu™, MSOs, cable TV operators, satellite TV operators, etc.) that legally requires resellers to verify that registered users (i.e. subscribers, subscriber's registered devices-iPhone iPad tablets etc.) are indeed residing in the proper location. This may be a contractual obligation that requires a licensee to utilize an industry standard geolocation service to verify that a registered user is located in the territory. For example, geolocations services may include location information based on DNS registrations, WHOIS databases, and Internet subnet mapping to prevent access to programs via the SVOD service from registered users outside the territory. SVOD services include Netflix™ that requires users to pay a monthly fee to access a bundled set of content. In view of these legal obligations in the video on demand industry, resellers have utilized blocking tools as countermeasures to meet their obligations, for example, blocking VPN and issuing proxies to identify specific IP-ranges of the legitimate subscriber service. Effectively, the reseller industry is maintaining "only in-home viewing" as a means to distribute media content.

Contrary to content provider systems that use geolocation blocking or similar techniques to restrict content access to a geolocation such as a user's home, the present disclosure may enable "out of home viewing" for a subscriber or other user of a video on demand or other content provider service. The present disclosure may enable such access in a way that may satisfy a content owner's policies, rules, and/or persistence restrictions for how the reseller of media content may allow playback or other access of the video and/or media content independent of location and/or without geofiltering restriction techniques.

The present disclosure may provide a set-top box, gateway, client, or other content access device that may be utilized to register and authenticate a subscriber (or other user) and the subscriber's devices so as to satisfy a content owner's policies, rules, and persistence restrictions for how the reseller of media content may allow playback of the video and/or media content independent of physical location of the device, hardware, or geographic location of the subscriber. Apparatuses, systems, and methods included herein may provide out of home viewing for a subscriber or user of a video on demand or other service that may satisfy a content owner's policies, rules, and persistence restrictions for how the reseller of media content may allow playback of the video and/or media content in a way that may be independent of geolocation and/or without geofiltering techniques.

The present disclosure may provide a set-top box, gateway, client, or other content access device that may be utilized to register and authenticate a subscriber (or other user) and the subscriber's devices so as to satisfy a content owner's policies, rules and persistence restrictions for how the reseller of media content may allow playback of the video and/or media content independent of location and/or filtering based geo-location restrictions. Apparatuses, systems, and methods included herein may provide out of home viewing for a subscriber or other user of a video on demand or other service that may satisfy a content owner's policies, rules, and persistence restrictions for how the reseller of media content may allow playback of the video and/or media content in a way that may be independent of geolocation and/or without geofiltering techniques in an efficient and cost effective manner.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 depicts example content access devices 101 and 103 in a first example content access system 100. The first example content access system 100 may include a first content access device 101 that is located at a first geolocation 110 and a second content access device 103 that is located at another geolocation 120.

For example, the first geolocation 110 may be a user's home and the first content access device 101 may be a set top box or other content access device located at the user's home that is operable to access content from one or more content providers. In such an example, the second geolocation 120 may be any location other than the user's home and the second content access device 103 may be any content access device such as a tablet computing device, smart phone, laptop computing device, and so on other than the set top box located at the user's home.

In the first example content access system 100, the first content access device 101 may be operable to access content from one or more content providers and present the content on a presentation device 102. The content provider may restrict content access to devices at the first geolocation 110. Thus, the first content access device 101 may be operable to access the content because it is located at the first geolocation 110. However, as the second content access device 103 is located at the second geolocation 120 instead of the first geolocation 110, the content provider may not allow the second content access device 103 to access the content.

As such, a user may only be able to access content from the content provider using the first content access device 101 even though the user may have a subscription and/or other account with the content provider. The user may desire to be able to use other content access devices to access the content, such as the second content access device 103, and/or access content from other locations than the first geolocation 110, such as the second geolocation 120. However, the first example content access system 100 may not allow the user this kind of flexibility.

In some implementations of this first example content access system 100, the second content access device 103 may not be able to access the content regardless of the location. In such an implementation, only the first content access device 101 may be used to access content. Such implementations may control content by allowing access to only a specific device as well as to the particular first geolocation 110.

In other implementations, the second content access device 103 may not be able to access the content when the second content access device 103 is located at the second geolocation 120 as shown, but may be able to access the content when moved to the first geolocation 110. Such implementations may control content by allowing access to any device verified as located at the first geolocation 110. The location of the second content access device 103 may be verified by one or more different procedures. For example, the second content access device 103 may be able to access the content via a network only accessible at the first geolocation 110, such as a content provider network to which the first content access device 101 is connected (whether through the first content access device 101 or independently). By way of another example, the second content access device 103 may be able to access the content via one or more various networks upon providing proof of location obtained via a location determination system, such as a global positioning system. However, though this implementation may provide more content access flexibility than the one discussed above, it may still not provide the content access flexibility that a user may desire.

Figure 2:
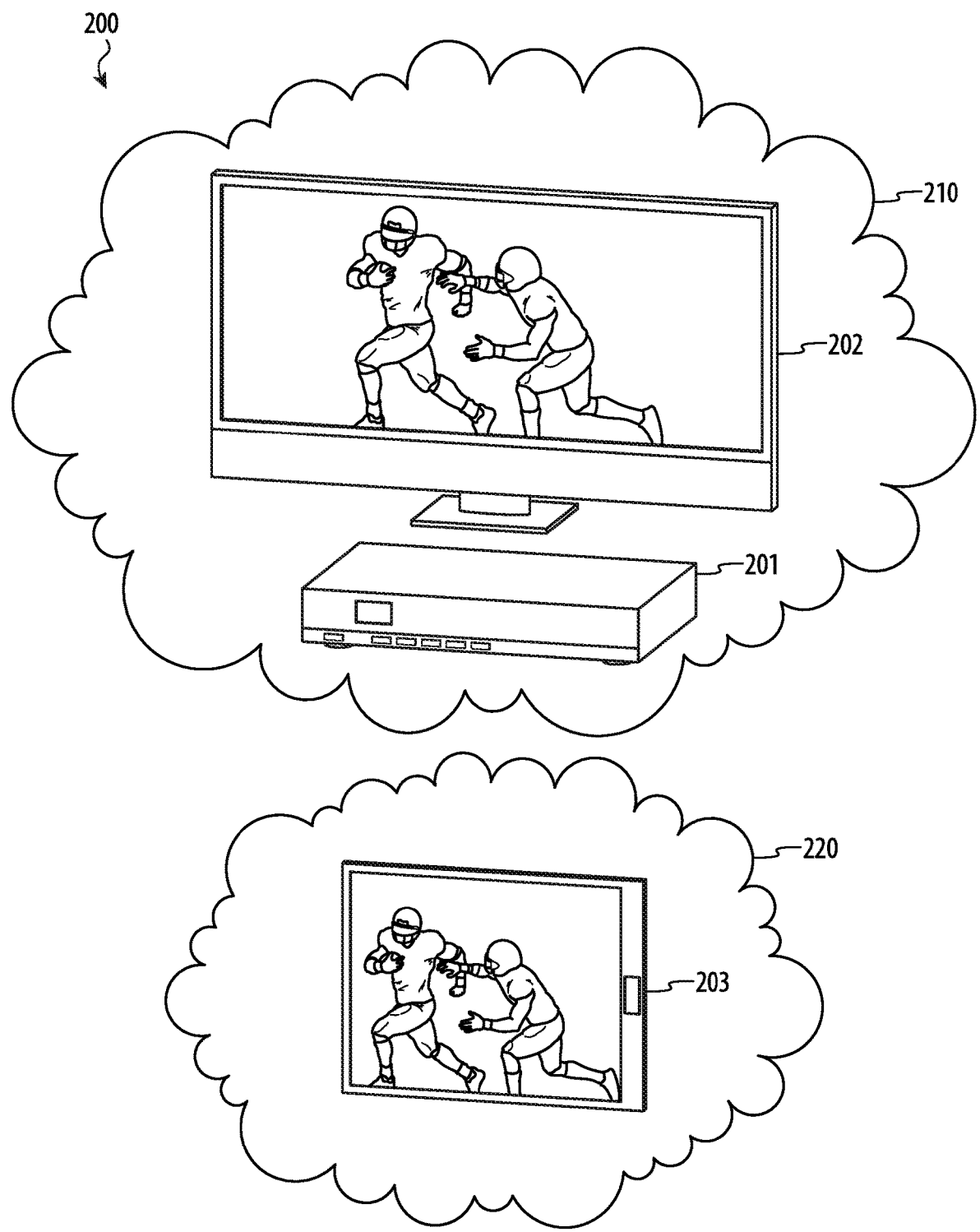
FIG. 2 depicts example content access devices in a second example content access system.

FIG. 2 depicts example content access devices 201 and 203 in a second example content access system 200. In this second example content access system 200, the second content access device 203 may be operable to access the content regardless of location as long as the second content access device 203 is determined to be registered to the user's account associated with the first geolocation 210 by the content provider or similar entity. Content provider subscription or other accounts are typically associated with a particular location, such as the first geolocation 210, and therefore the association can be utilized to verify the user's link to an approved location. Thus, the second content access device 203 may be operable to access the content in a way that may be independent of geolocation. As such, the second content access device 203 may be operable to access the content when it is located at the second geolocation 220, the first geolocation 210, and/or various other geolocations.

For example, the user may submit a request for the content via the second content access device 203. When the content provider receives the request, the content provider may determine whether or not the second content access device 203 is registered to the user's account associated with the first geolocation 210. If so, the content provider may provide access to the content via the second content access device 203. Otherwise, the content provider may return an error message, prompt the user to register the second content access device 203, provide access to alternative content that does not require an association to a particular geolocation, and/or perform various other actions besides allowing access to the requested content.

In some examples, the first content access device 201 may use geolocation verification to access content from the content provider similar to the first example content access system 100 discussed above. However, in other examples, the first content access device 201 may be registered to the user's account associated with the first geolocation 210 and may be authorized for content access similar to the second content access device 203.

In various implementations, the request may involve a token or other similar authentication mechanism. The content provider may verify that the token indicates that the second content access device 203 is registered to the user's account associated with the first geolocation 210. Such a token may be stored by the second content access device 203, such as in implementations when the second content access device 203 receives the token during registration, and subsequently transmitted along with requests. In various examples of such implementations, the token may be encrypted and/or otherwise be configured with anti-forgery or similar mechanisms. In other implementations, a token may be stored by the content provider and may be created when the second content access device 203 is registered. The token may then be retrieved using an indicator transmitted with the request. Examples of an indicator may include various identifiers associated with the user, the account, the second content access device 203, and the like.

In some implementations, the content provider may evaluate the request based on one or more digital rights management policies and/or persistence policies. For example, the content provider may evaluate one or more digital rights management policies and/or persistence policies with respect to the requested content, the second content access device 203, the first content access device 201, the second geolocation 220, the first geolocation 210, the user, and so on. These digital rights management policies and/or persistence policies may specify who may be allowed to access what content, what they may do with the content, the circumstances under which they may access the content and/or various actions they may perform with respect to the content, and so on.

In various implementations, the content provider may comply with such policies in order to provide access to only one copy of the content at a time. For example, the user may submit a request for an instance of content using the second content access device 203. However, that instance of content may already be currently being accessed by the first content access device 201. In such a situation, various actions may be performed to ensure only a single copy of the instance of content is accessed at a current time. This may include, but it not limited to, disabling access to the instance of content by the first content access device 201 and allowing access to the second content access device 203, denying the second content access device 203 access because the instance of content is currently being accessed, delaying access to the second content access device 203 until the first content access device 201 is no longer accessing the instance of content, and so on.

By way of another example, the user may submit a request for an instance of content using the second content access device 203 after that instance of content has been stored to the first content access device 201. In such a situation, even though the first content access device 201 is not currently accessing the content, various actions may be performed to ensure only a single copy of the instance of content is accessed at a current time. This may include, but it not limited to, removing the instance of content from the first content access device 201, locking the instance of content on the first content access device 201 so that the stored instance of content cannot be accessed by the first content access device 201 until the second content access device 203 is no longer accessing the instance of content, denying the second content access device 203 access because the instance of content is stored on the first content access device 201, delaying access to the second content access device 203 until access by the first content access device 201 is revoked and/or the instance of content is otherwise removed from the first content access device 201, and so on.

Although FIG. 2 depicts the first content access device 201 as a set top box operable to present content on an associated presentation device 202 and the second content access device 203 as a tablet computing device operable to present content on one or more integrated presentation components, it is understood that this is an example. In various implementations, the first content access device 201 and/or the second content access device 203 may be any kind of content access device operable to access content. Examples of such content access devices include, but are not limited to, one or more set top boxes, televisions, smart phones, wearable devices, desktop computing devices, mobile computing devices, cellular telephones, digital media players, displays, tablet computing devices, and so on.

Figure 3:
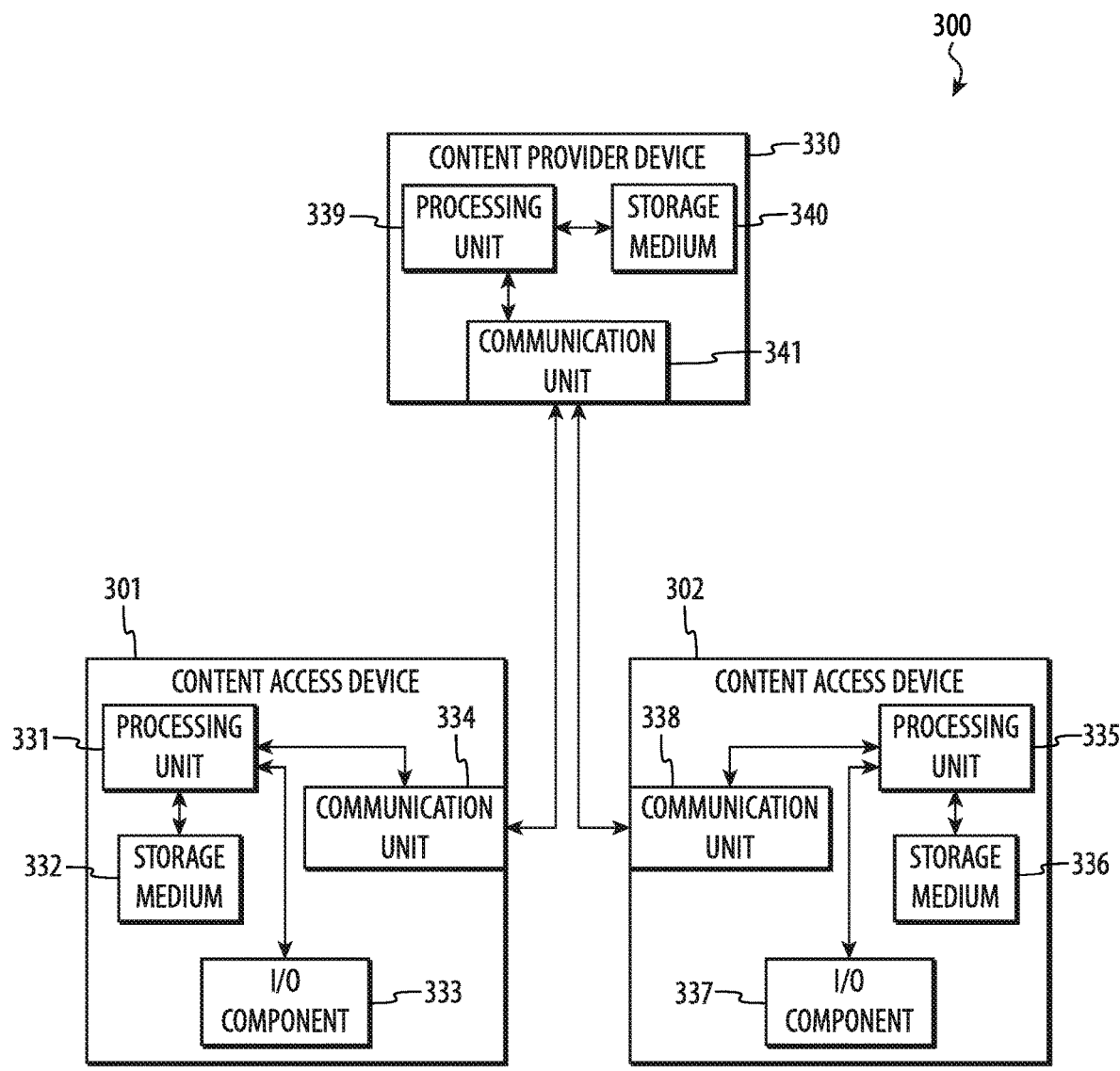
FIG. 3 depicts a block diagram illustrating example components and relationships in an example implementation of a content access system. The content access system may be the second example content access system of FIG. 2.

FIG. 3 depicts a block diagram illustrating example components and relationships in an example implementation of a content access system 300. The content access system 300 may be the second example content access system 200. The content access system 300 may include one or more content provider devices 330 and one or more content access devices 301, 302.

The content access devices 301, 302 may respectively include one or more processing units 331, 335; non-transitory storage media 332, 336 (which may take the form of, but is not limited to, a magnetic storage medium; optical storage medium; magneto-optical storage medium; read only memory; random access memory; erasable programmable memory; flash memory; and so on); input/output components 333, 337 (such as one or more speakers, displays, keyboards, touch screens, and so on), communication units 334, 338; and so on. The content provider device 330 may similarly include one or more processing units 339, non-transitory storage media 340, communication units 341, and so on.

The content access devices 301, 302 may respectively use the processing unit 331, 335 to execute instructions stored in the non-transitory storage medium 332, 336 to perform various content access device 301, 302 functions. Such functions may include, but are not limited to, communicating with the content provider device 330 via the communication unit 334, 338 to access content; presenting accessed content via the input/output component 333, 337; store content, tokens, and/or other data to and/or retrieve such from the non-transitory storage medium 332, 336; and so on.

Similarly, the content provider device 330 may use the processing unit 339 to execute instructions stored in the non-transitory storage media 340 to perform various content provider device 330 functions. Such functions may include, but are not limited to, receive requests for content and/or provide access to content via the communication unit 341; register content access devices, store information about such in the non-transitory storage medium 340, and/or retrieve such information therefrom; evaluate one or more digital rights management policies and/or persistence policies stored in the non-transitory storage medium 340; store content in and/or retrieve content from the non-transitory storage medium 340; verify content access devices are registered to accounts associated with geolocations; and so on.

In a particular embodiment of the content provider device 330, the processing unit 339 executes instructions stored in the non-transitory storage medium 340 to receive a request for content from one of the content access devices 301, 302 and, if the content access device 301, 302 is registered to an account associated with a geolocation, provide access to the content.

The processing unit 339 may receive a registration request indicating the content access device 301, 302, identify the account, and register the content access device 301, 302 to the account. The processing unit 339 may receive the registration request based on communication between the content access device 301, 302 and an additional content access device 301, 302 already associated with the account. The processing unit 339 may receive the registration request from the additional content access device 301, 302.

The processing unit 339 may transmit a token to the content access device 301, 302 as part of registering the content access device 301, 302 to the account. The account may be a content provider subscription account. The content may be on-demand video content.

In another particular embodiment of the content provider device 330, the processing unit 339 executes instructions stored in the non-transitory storage medium 340 to receive a request for content from a content access device 301, 302, the request including a token; verify the token indicates the content access device 301, 302 is registered to an account associated with a geolocation; and, if a digital rights management policy indicates the account is allowed to access the content, provide access to the content.

The processing unit 339 may receive the token from the content access device 301, 302. The processing unit 339 may retrieve the token from the non-transitory storage medium 340 using an indicator transmitted by the content access device 301, 302.

The digital rights management policy may specify obligations a provider of the content owes to an owner of the content. The token may be encrypted. The content may be broadcast video content. The access to the content may be provided by pulling one or more adaptive bit rate segments.

In still another particular embodiment of the content provider device 330, the processing unit 339 executes instructions stored in the non-transitory storage medium 340 to receive a request for content from a content access device 301, 302; determine whether the content access device 301, 302 is registered to an account associated with a geolocation; and, if digital rights management and persistence policies indicate the account is allowed to access the content, provide access to one copy of the content at a time. The digital rights management and persistence policies may restrict access to the content based on geolocations including the geolocation.

The processing unit 339 may revoke access to the content by the content access device 301, 302 before allowing an additional request for the content from an additional content access device 301, 302 registered to the account. The processing unit 339 may deny an additional request for the content from an additional content access device 301, 302 registered to the account if access to the content by the content access device 301, 302 has not yet been revoked. The processing unit 339 may provide access to the content by the content access device 301, 302 when the content access device 301, 302 is located other than at the geolocation. The processing unit 339 may provide access to the content by the content access device 301, 302 independent of the location of the content access device 301, 302.

Figure 4:
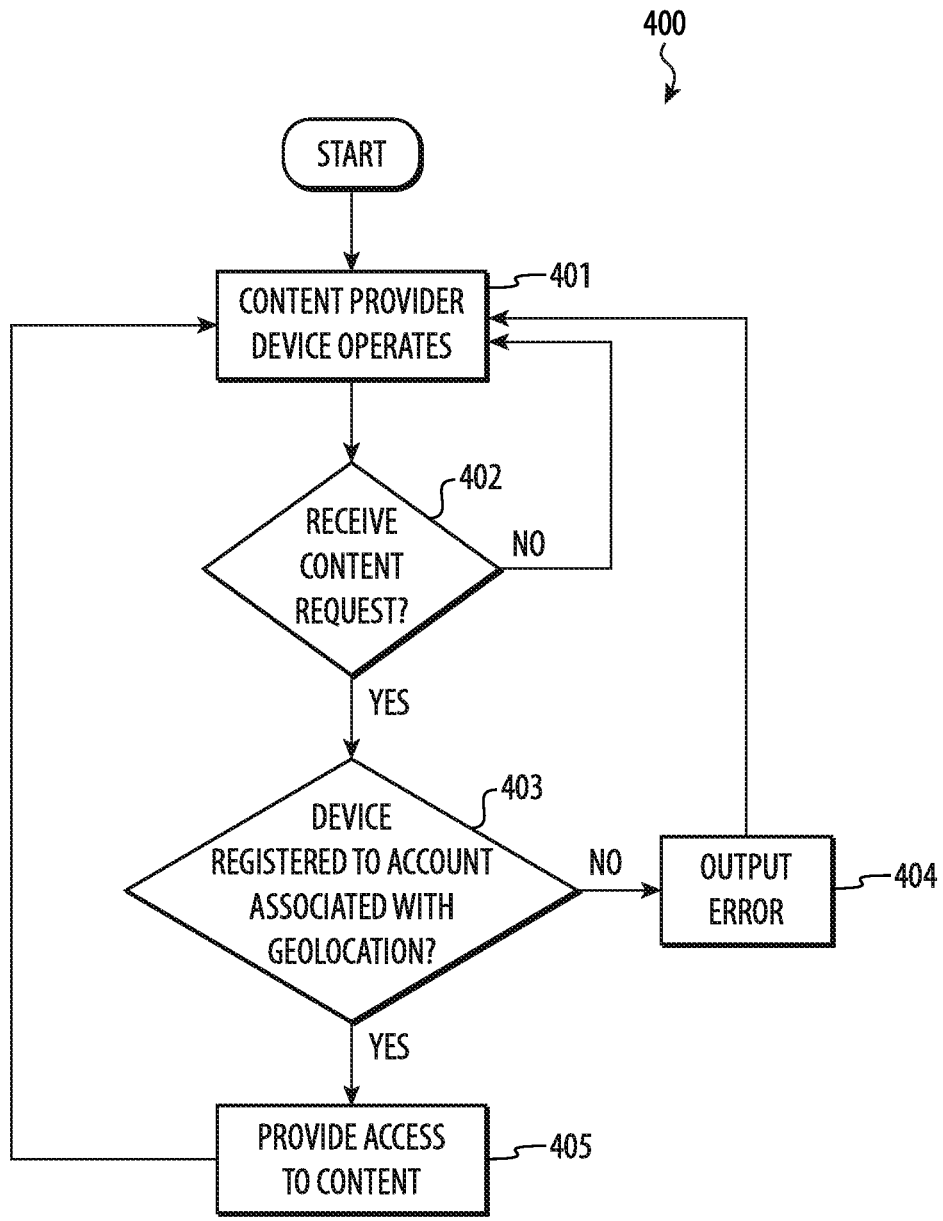
FIG. 4 depicts a flow chart illustrating a first example method for geolocation independent content rights management. This first example method may be performed by the system of FIG. 2 or 3.

FIG. 4 depicts a flow chart illustrating a first example method 400 for geolocation independent content rights management. This first example method 400 may be performed by the content access system 200 or 300 of FIG. 2 or 3.

At 401, a content provider device operates. The flow then proceeds to 402 where the content provider device determines whether or not a request for content is received. If so, the flow proceeds to 403. Otherwise, the flow returns to 401 where the content provider device continues to operate.

At 403, after the content provider device determines a request for content is received, the content provider device determines whether or not the request is from a content access device registered to an account associated with a geolocation. If not, the flow proceeds to 404 where the content provider device outputs an error message indicating the request will not be fulfilled before the flow returns to 401 where the content provider device continues to operate.

Otherwise, the flow proceeds to 405 where the content provider device provides access to the content. The flow then returns to 401 where the content provider device continues to operate.

The content provider device may determine whether or not the request is from a content access device registered to an account using a variety of different protocols or procedures. Examples include, but are not limited to, the content provider device evaluating a token provided by and/or referenced by the content access device, a user name and password and/or other login information for the account, an address or other identifier for the content access device, and so on.

Although the first example method 400 is illustrated and described as including particular operations performed in a particular order, it is understood that this is an example. In various implementations, various orders of the same, similar, and/or different operations may be performed without departing from the scope of the present disclosure.

For example, 403 is illustrated and described as the content provider device evaluating all content requests to determine whether or not the request is from a content access device registered to an account associated with a geolocation. However, it is understood that this is an example. In some implementations, the content provider device may verify registration for some content but not for other content, or for requests that are received via some communication media but not for those received via other communication media. In other implementations, the content provider device may verify registration for content access devices that do not have verified approved geolocations but not verify registrations for content access devices that do. Various configurations are possible and contemplated.

By way of another example, 404 is illustrated and described as the content provider device providing an error message if the content access device is not registered. However, it is understood that this is an example. In various implementations, the content provider device may perform various other actions such as prompting for content access device registration, offering access to content that does not require registration, and so on.

By way of still another example, the first example method 400 is illustrated and described as providing access to content from devices that are registered to an account associated with a geolocation. In such examples, the geolocation may be a location where a user has registered to use a device. In some cases, the location may correspond to the user's home. As such, the user may be able to travel with the user's device and access any content that would have been accessible at the user's home regardless where the user happens to be.

For example, when the user uses the device to request content, it may be determined whether or not that content is authorized for geolocations corresponding to the user's home. This may be the case even if the user is in another city, another state, another country, and so on. If the content would be authorized for geolocations corresponding to the user's home, the user may be allowed to access the content using the device. This may be allowed even if access to the content would be denied for the user's actual location.

At the same time, access to content that would be allowed for the user's actual location may be denied if it would be denied at the user's home. This may allow the user to travel with the device, but not obtain access to unauthorized content simply by traveling.

However, in some implementations, the device may first be granted access rights corresponding to the geolocation associated with the registered account. Additional access rights corresponding to a current location may then be added. In some cases, these additional access rights may be the full access rights associated with the current location. In other cases, these additional access rights may be the partial access rights associated with the current location. For example, additional access rights corresponding to a subset of the full rights associated with the current location may be granted. This may function as a preview of what content is available in the area of the user's current location.

Alternatively, content such as weather or news may be authorized for any location where a user happens to be whereas entertainment content is restricted to the user's registered location. In this way, the user cannot access additional entertainment content simply by traveling, but may be able to access necessary information such as news, weather, and so on.

In various implementations, access rights for the user's actual location may be granted in addition to the access rights corresponding to the user's home. Access rights corresponding to the user's home may then be granted. Additional access rights corresponding to the user's actual location, whether full or partial for what they would be if the user's account was registered to the user's actual location, may then be added.

For example, a user may register an account in Denver. The user may travel with a device to Houston. Access rights to content allowed in Denver may first be applied to the device. Then, full or partial rights to content allowed in Houston may additionally be applied. The user may then be able to use the device to access any of the content to which rights have been granted.

In such an example, it may first be determined whether or not the content would be authorized at the user's home. If so, access to the content may be allowed. If not, it may be determined whether local rights at the user's actual location have been granted that would allow for the content to be accessed. If so, access may still be allowed even though the content would not have been allowed at the user's home. Various configurations are possible and contemplated without departing from the scope of the present disclosure.

Figure 5:
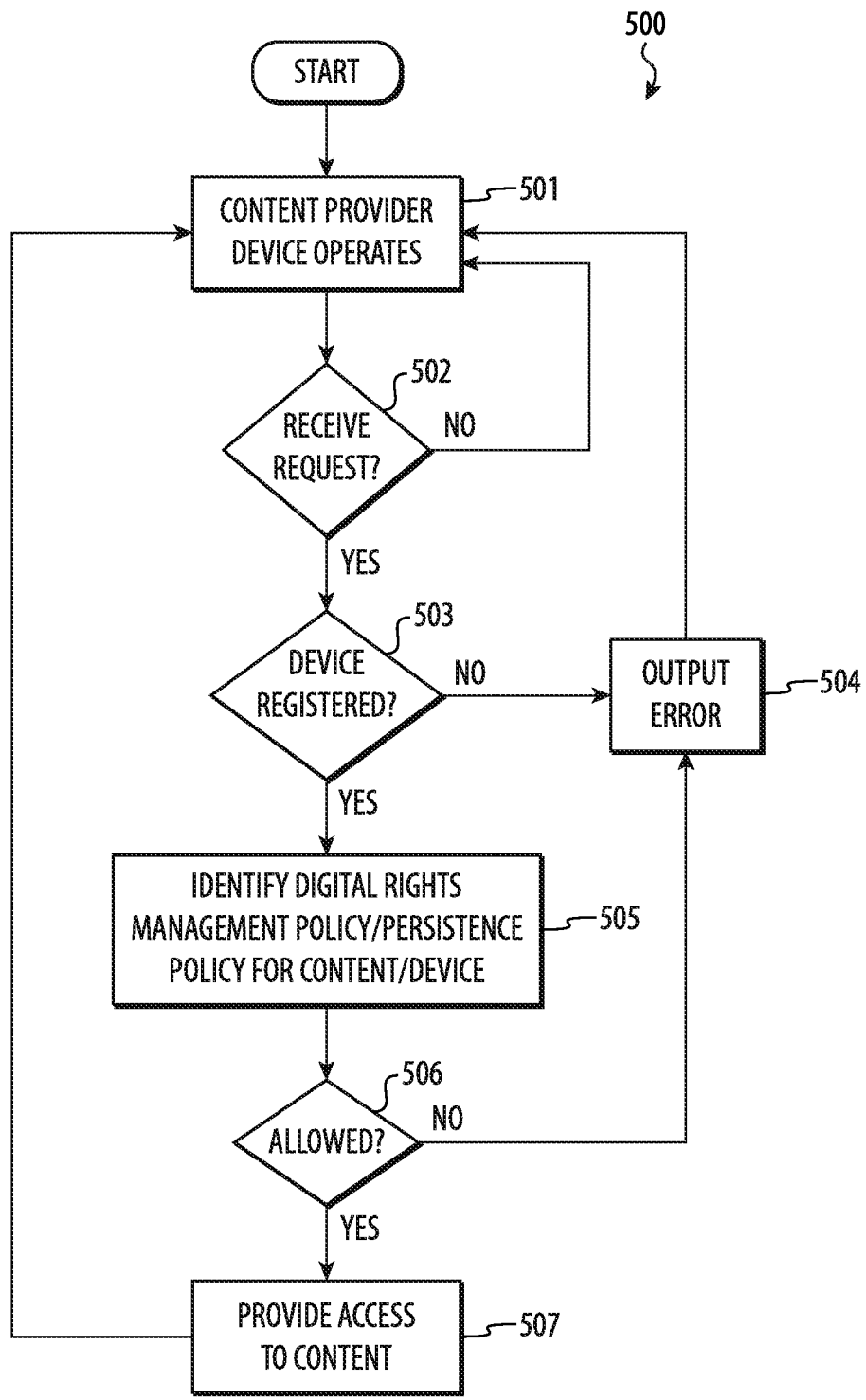
FIG. 5 depicts a flow chart illustrating a second example method for geolocation independent content rights management. This second example method may be performed by the system of FIG. 2 or 3.

FIG. 5 depicts a flow chart illustrating a second example method 500 for geolocation independent content rights management. This second example method 500 may be performed by the content access system 200 or 300 of FIG. 2 or 3.

At 501, a content provider device operates. The flow then proceeds to 502 where the content provider device determines whether or not a request for content is received. If so, the flow proceeds to 503. Otherwise, the flow returns to 501 where the content provider device continues to operate.

At 503, after the content provider device determines a request for content is received, the content provider device determines whether or not the request is from a content access device registered to an account associated with a geolocation. If not, the flow proceeds to 504 where the content provider device outputs an error message indicating the request will not be fulfilled. The flow then returns to 501 where the content provider device continues to operate.

Otherwise, the flow proceeds to 505 where the content provider device identifies one or more digital rights management policies and/or persistence policies that apply to the requested content. The flow then proceeds to 506.

At 506, the content provider device determines whether or not the requested access to the content is allowed based on the identified digital rights management policies and/or persistence policies. If so, the flow proceeds to 507 where the content provider device provides access to the content. The flow then returns to 501 where the content provider device continues to operate. Otherwise, the flow proceeds to 504 where the content provider provides an error message.

Although the second example method 500 is illustrated and described as including particular operations performed in a particular order, it is understood that this is an example. In various implementations, various orders of the same, similar, and/or different operations may be performed without departing from the scope of the present disclosure.

For example, the second example method 500 may perform the additional operation of ensuring that only a single copy of the requested content is available to the account at a given time. Such an operation may involve tracking accesses to the requested content for the account, monitoring current statuses of those accesses, and so on.

Figure 6:
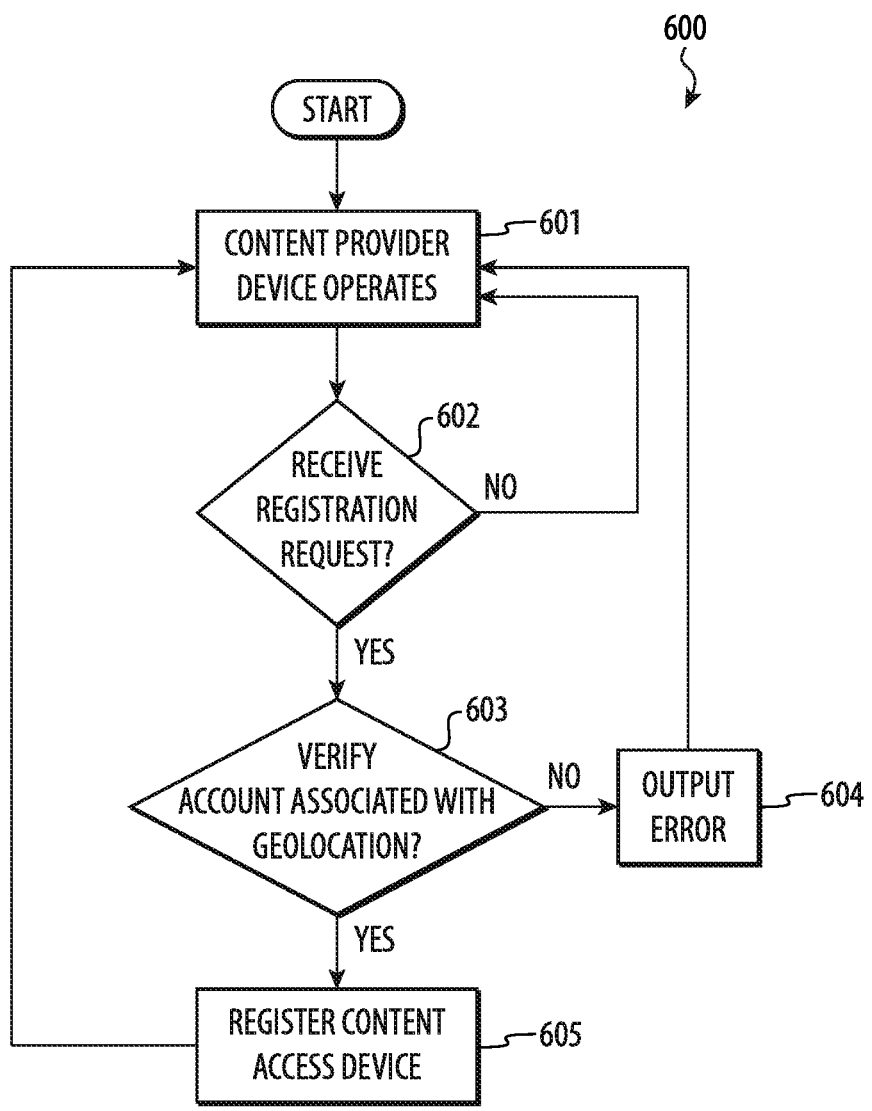
FIG. 6 depicts a flow chart illustrating an example method for registering content access devices in a system for geolocation independent content rights management. This example method may be performed by the system of FIG. 2 or 3.

FIG. 6 depicts a flow chart illustrating an example method 600 for registering content access devices in a system for geolocation independent content rights management. This example method 600 may be performed by the content access system 200 or 300 of FIG. 2 or 3.

At 601, a content provider device operates. The flow then proceeds to 602 where the content provider device determines whether or not a request to register a content access device for an account is received. If so, the flow proceeds to 603. Otherwise, the flow returns to 601 where the content provider device continues to operate.

At 603, the content provider device determines whether or not an account associated with a geolocation identified by the request can be verified. If not, the flow proceeds to 604 where the content provider device provides an error message. The flow then returns to 601 where the content provider device continues to operate.

Determining whether or not an account associated with a geolocation identified by the request can be verified may involve various authentication procedures or protocols. For example, this may involve evaluating a user name and password or other login information or identifiers associated with the account and provided with the request. By way of another example, the content access device may communicate with a content access device that is already registered and information about the successful pairing of the content access devices may be transmitted by one or more of the content access devices to the content provider device in order to register the new content access device.

Otherwise, the flow proceeds to 605 where the content provider device registers the content access device to the account associate with the geolocation. The flow then returns to 601 where the content provider device continues to operate.

Although the example method 600 is illustrated and described as including particular operations performed in a particular order, it is understood that this is an example. In various implementations, various orders of the same, similar, and/or different operations may be performed without departing from the scope of the present disclosure.

For example, 604 is illustrated and described as the content provider device providing an error message if the account cannot be verified. However, it is understood that this is an example. In various implementations, the content provider device may perform various other actions such as prompting the user of the content access device to open an account with the content provider. Various configurations as possible and contemplated.

A particular example implementation system 800 for geolocation independent content rights management will now be discussed in detail with respect to FIGS. 7-9. The system 800 may perform a process 700 for providing media content to a subscriber of a content provider service. For example, the content may be broadcast media content, television broadcast programs, video on demand, digital video, music, and the like provided via an on-demand provider service, a broadcast provider service, and so on.

The system 800 may be implemented in a content delivery network (CDN) 847 using computing devices to distribute copies of data placed at various nodes of a network by subscription to the device of a user or subscriber by pulling adaptive bit rate (ABR) segments from storage available on the CDN 847. A video core 849 may be adapted to process and segment linear and/or non-linear media content 850, 851 from a live broadcast stream into multi-bit rate streams of numerous resolutions, store the streams on the system 800, and make file information of the media content 850, 851 available to a resource manager 840. For example, the file information may involve a manifest file, a catalog service 971 accessible through a catalog application programming interface (API) 974 to a metadata database 972, and scheduler service 976 accessible through a scheduler API 968 to a scheduler database 970. As described herein, the system 800 may perform the process 700 to provide the media content 850, 851 to a subscriber on-demand on any registered device 803, whether inside of the home, outside of the home, and/or various other geolocations.

Figure 7:
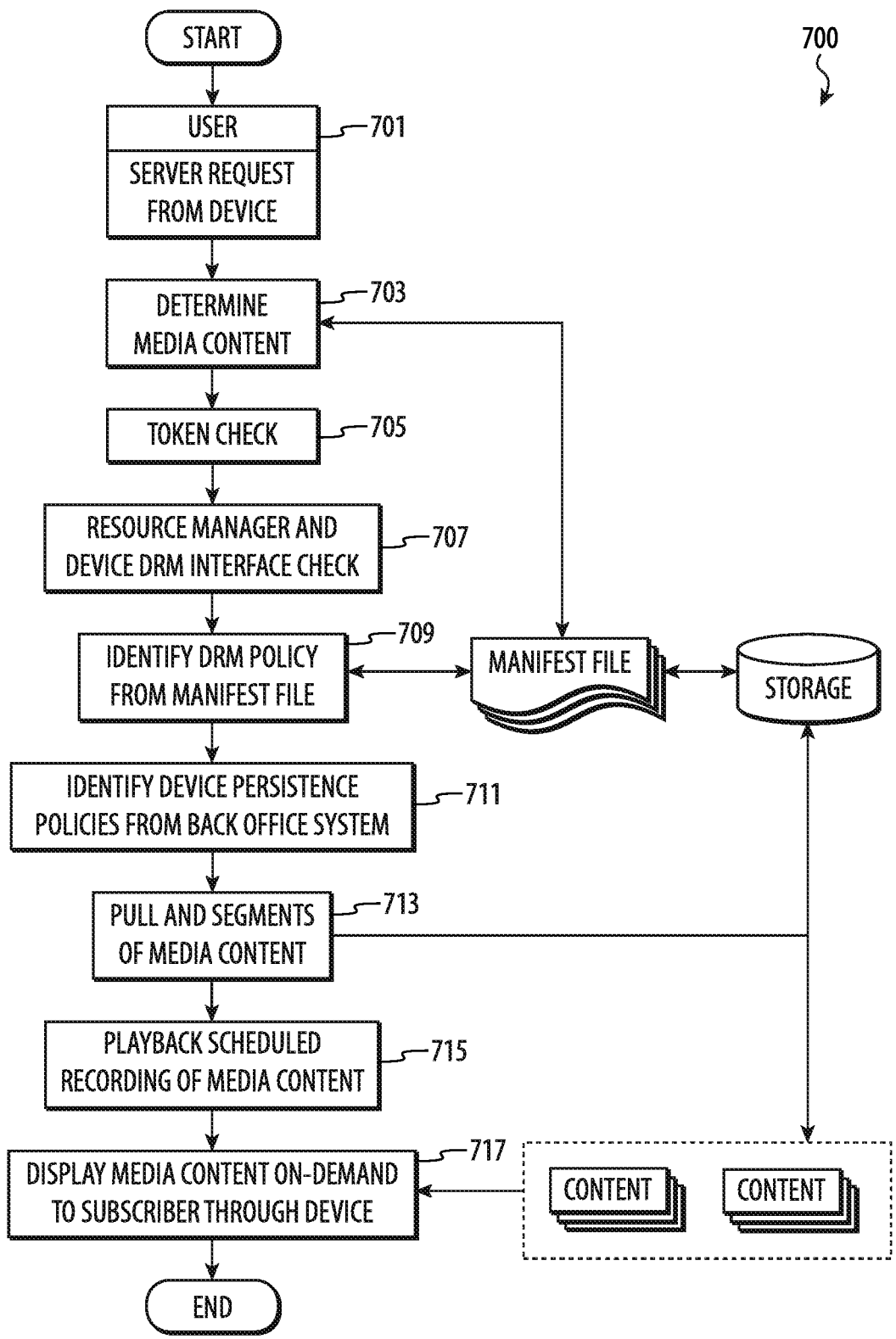
FIG. 7 depicts a process flow diagram illustrating performance of a third example method for geolocation independent content rights management.
Figure 8:
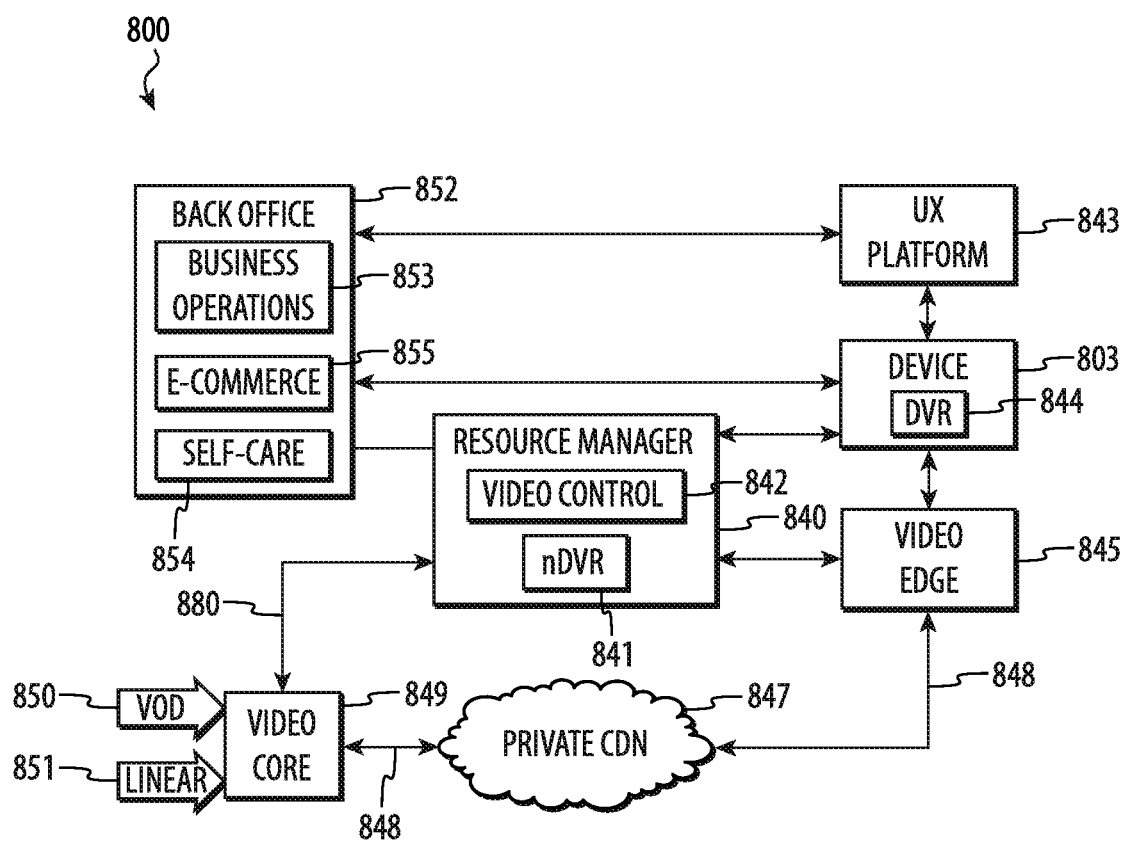
FIG. 8 depicts a first block diagram illustrating example components and relationships in an example implementation of an example content access system that may perform the third example method for geolocation independent content rights management illustrated in FIG. 7.

Referring to FIG. 7, a process 700 may be configured to provide media content to a subscriber of an on-demand or other content provider service. In operation, the system 800 may perform the process 700 using the CDN 847, resource manager 840, back office 852, manifest file, catalog service 971, and/or other components. The process 700 may be implemented by computer-implemented software or one or more APIs that may interface with and may be controlled by the resource manager 840, the back office 852, the scheduler service 976 via the scheduler API 968, and catalog API 974 of the catalog service 971. Accordingly, the process 700 may be adapted for the media content 850, 851. The process 700 may be a machine-implemented process including one or more steps implemented by a general purpose computer, servers, and/or other hardware and software of the CDN 847.

At 701, a resource manager 840 or other component may receive a service request sent by a subscriber and/or user from a registered device 803. At 703, the resource manager 840 may identify or otherwise determine one or more adaptive bit rate (ABR) segments for the media content 850, 851 associated with the service request from the CDN 847. For example, the resource manager 840 may reference a manifest file.

At 705, the resource manager 840 may perform a token/restriction check 958 to determine whether the service request has been validly sent by a subscriber and/or user that has a profile in a back office system 852 and/or that it has been sent from a registered device 803.

Figure 9:
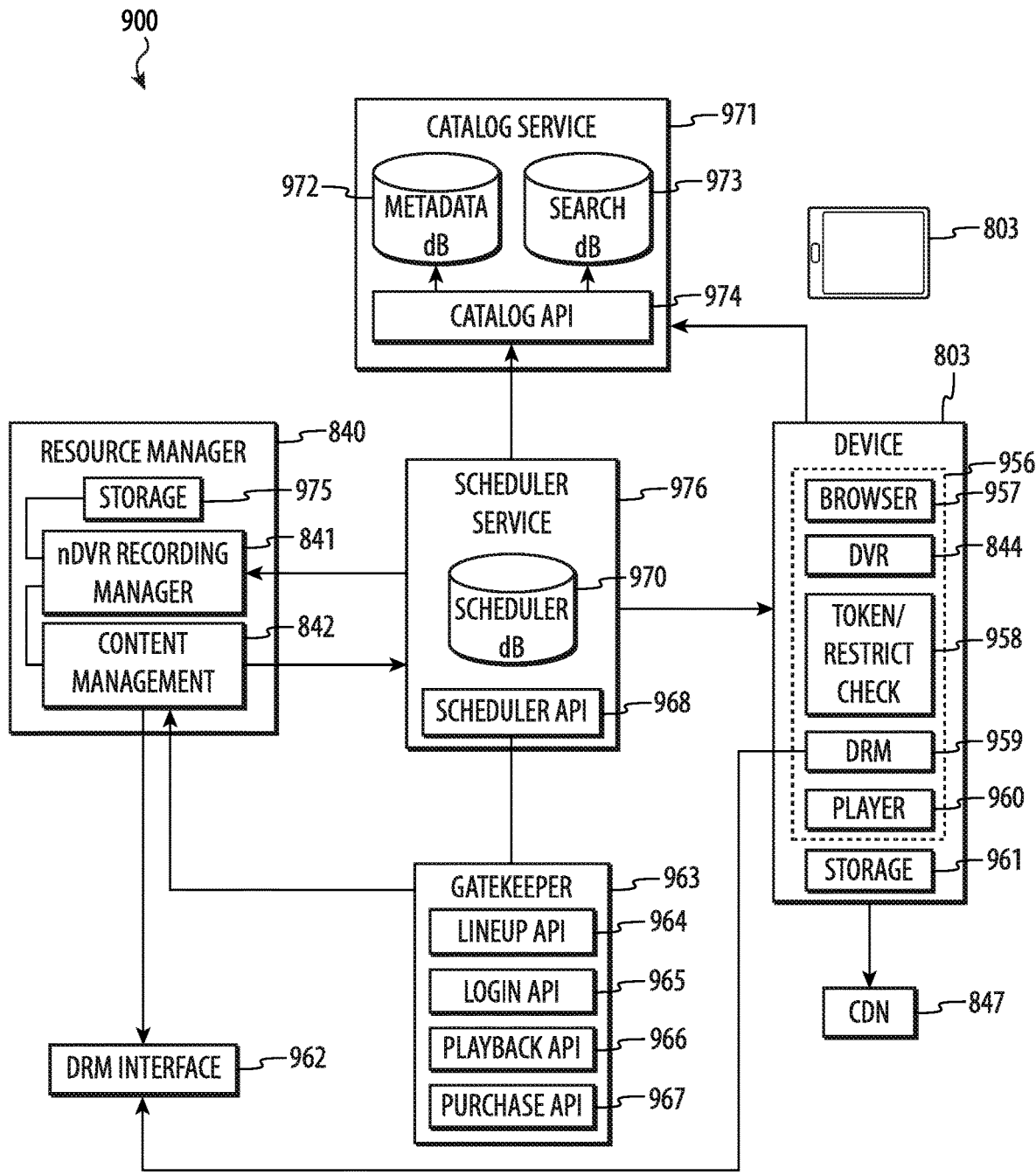
FIG. 9 depicts a second block diagram illustrating the example components and relationships in the example implementation of the example content access system that may perform the third example method for geolocation independent content rights management illustrated in FIG. 7.

Referring to FIG. 9, the device 803 may send a token/restriction check 958 to a gatekeeper 963 using one or more of APIs to validate the device 803 with a content management system or video control 842 of the resource manager 840. For example, such APIs may include a lineup API 964, a login API 965, a playback API 966, a purchase API 967, or the like.

At 707, the content management system or video control 842 of the resource manager 840 may check with a digital rights management (DRM) interface 962 to determine a DRM policy for viewing and/or otherwise using the media content 850, 851 based on obligations to a content owner. Moreover, the device 803 may further include DRM 959 that may be checked with the DRM interface 962 so as to establish viewing, copying, and/or other rights under various persistence and digital rights policies.

At 709, DRM policy for viewing the media content 850, 851 based on obligations to a content owner may be determined by identifying a DRM policy from a manifest file associated with the media content 850, 851 in one or more ABR streams. The resource manager 840 may use the manifest file to determine digital rights policies of the media content 850, 851 as well as use the back office system 852 for determining persistence policies to apply for the subscriber's profile and the subscriber's registered device(s) 803 in order to allow viewing of the media content 850, 851 based on obligations to a content owner.

At 711, a device policy may be identified from a back office system 852 in the CDN 847. For example, the token/restriction 958 and DRM 959 for a device 803 may be checked to see if the device 803 is registered in the system 800 by verifying a token for the subscriber with the resource manager 840 and/or the back office system 852. The device policy may be managed by the system 800 such that a particular device 803 may be registered to have a copy of the media content 850, 851 placed on it for viewing by a particular subscriber in any location. Such a location may be independent of the subscriber's home, outside the subscriber's home, and so on. Also at 711, a persistence policy for copying the media content 850, 851 to the device 803 may be identified based on obligations to a content owner registered in the DRM interface 962 such that the system 800 may pull and send one or more ABR segment(s) of the media content to the subscriber's registered device 803. In this manner, a copy of the media content 850, 851 may be placed on the registered device 803 for viewing by the particular subscriber in any location.

At 713, one or more ABR segments may be pulled using the resource manager 840 for the subscriber when the device 803 passes the token and DRM interface checks for compliance with the persistence and digital rights policies so as to allow the copying of the media content 850, 851 to network storage 975, or storage 961 on the device 803 as registered for the particular subscriber. At 715, playing or recording of the media content 850, 851 may be scheduled for the subscriber using, for example, the player 960 of the device 803. At 717, one or more ABR segments of the media content 850, 851 may be played independent of the subscriber's location so as to allow the viewing of the media content 850, 851 on the device 803.

The system 800 may be configured with a video core 849 adapted for content processing and communication for ingesting and packaging linear content 851 (e.g., live broadcasting) and non-linear (e.g., video on demand (VOD)) content 850 by communication lines 848 across a communication network or CDN 847 to a video edge 845 to service a device 803 (e.g., set top box, tablet, smart phone, computer, etc.) of a user that subscribes to a content subscription service. The video core 849 may also communicate with a resource manager 840 over communication lines 880 to provide information about the ingested and packaged linear content 851 and non-linear content 850 such as, for example, by maintaining a manifest file. The manifest file may identify and store media content information and/or metadata. For example, the manifest file may capture persistence and digital rights policy for the media content 850, 851 in the CDN 847. The manifest file further may store metadata information to identify the media content 850, 851. The manifest file and/or a HLS (hypertext transfer protocol (HTTP) live streaming) header may be used to provide the information persistence and digital rights policy for use by the resource manager 840 and back office 852 with such information stored with the media content 850, 851 in network storage 975. The back office 852 may involve business operations 853 (e.g., regulations, licenses, etc.), e-commerce 855 (e.g., subscriber billing, payments, etc.) and a self-care 854 portal (e.g., updates, remote servicing of devices, etc.). A user experience platform 843 may be a multi-dimensional platform to present content media to the user in a predetermined graphical user interface (GUI). The DRM interface 962 may be adapted to interface with the user device 803.

The resource manager 840 may be responsible for persistence and digital rights policy along with allocating, monitoring, and controlling resources, particularly pulling ABR segments and bandwidth therefor, for recording and playback related services. The resource manager 840 may use token management to authorize viewing of copyrighted content according to policies and rights management across the CDN 847. The resource manager 840 in conjunction with the DRM interface 962 may authorize a particular device 803 utilizing the token restriction check 958. The resource manager 840 also may check persistence and digital rights policy using the gatekeeper 963.

According to various examples, the content media may be, for example, linear broadcasting and non-linear or VOD content media (e.g., audio and podcast hosting, video delivery, live streaming, flash streaming), downloadable objects (media files, software, documents), and live broadcast linear and database queries. Numerous devices may be available for a user to play the content media such as TV, HD-monitors, and mobile devices. The system 800 may be implemented using a digital video recorder (DVR) integrated device (e.g., a set top box) and/or on a network digital video recorder (nDVR). A CDN 847 system may be configured as described in U.S. patent application Ser. No. 14/765,575 entitled System and Method of Distributing Content Based On Trending and Preemptive Data, which is incorporated by reference in its entirety. In some examples, when recording TV, video and/or movie content media files, the video core 849 may ingest non-linear content 850 and linear content 851 and package such to encode one or more media content segments for distribution across the CDN 847, for example, using ABS. The media content segments may not be multicast or broadcast to the end client, but may only be retrieved by an active request to pull them (for instance, using HTTP GET request) from the network serving device such as, for example, device 803 using the CDN 847.

According to some examples, the system 800 may be configured to transmit and store content media segments and file information using HLS protocol and ABR technologies for distribution across the CDN 847. In this manner, the system 800 may use HLS for the file information of the segments of media content pre-timing advantages of ABR by dynamically monitoring CPU and memory capacity to make corresponding adjustments in the video quality of the transmitted content media by encoding the source linear and non-linear content (e.g., live broadcast, movie, video, etc.) at varying bit rates, and then segmenting each of the different bit rate streams. The segment length may be a predetermined size and duration, for example, between 2 and 10 seconds. The client or user's device 803 may include a player 960 to use the ABR advantageously to switch among the different bit rate segments, thereby locating the segments that correspond best to the bandwidth. In this manner, the system 800 may make use of CDN 847 efficiencies using technologies such as ABR, fragmented MPEG-4 files, or other formats that may be delivered via download technology so as to utilize the HTTP information file or file header to provide information and/or metadata regarding the media content 850, 851 for later reference by the user.

The resource manager 840 may be responsible for allocating, monitoring, and controlling resources, particularly pulling ABR segments and bandwidth therefor, for recording and playback related services. The resource manager 840 may integrate a nDVR 841 for the recording and/or playback of linear 851 and non-linear 850 content by content management system or video control 842. According to a DVR embodiment, the device 803 may integrate a DVR 844 for the recording and/or playback of linear 851 and non-linear content 850 in storage on the device 803. It is to be appreciated that the a desired ABR segment of media content 850, 851 may be pulled from storage on CDN 847 and supplied or otherwise communicated to the nDVR 841 resource in the cloud and DVR 844 on the device 803 for the user.

According to an embodiment, the system 800 may be configured to transfer information in the segments or in one or more multiple bit rate segments and file information of the content media files (e.g., media segments representing frames of video or other programming) by way of HLS to transfer and deliver across the CDN 847 from the video core 849 to the video edge 845 closest to the client device 803. The system 800 may be configured to use ABR technologies to identify persistence and rights management policies, file information and other use policies for the subscriber associated with the transmitted content media files using HLS or other HTTP protocols for distribution across the communications network, for example, a private CDN 847.

The system 800 may be configured to provide persistence and digital rights policy for the media content 850, 851 in situations when a user decides to store for later viewing independent of location, or use the DVR 844 or nDVR 841, to record a desired scheduled broadcast media content 850, 851, and to then view or otherwise display the media content 850, 851 at a later time independent of a location.

The video core 849 may be configured to ingest, segment and package the input linear 851 and non-linear 850 media content into ABR segments for later pulling ABR segments across CDN 847 to the video edge 845 for accessing by the user's device 803. A catalog of file information, metadata and other information about the content 850, 851 may be written into a manifest file that may be stored on a resource manager 840 for content management system or video control 842. When the user accesses the content media file(s) 850, 851, the user's device 803 may request the segments from the CDN 847 by an address given in the manifest file. The resource manager 840 may control pulling of ABR segments of content media file(s) 850, 851 to the user's device for playback and display.

The system 800 may use ABR by dynamically monitoring CPU and memory capacity to make corresponding adjustments in the video quality of the transmitted content media by encoding the source linear and non-linear content (e.g., live broadcast, movie, video, etc.) at varying bit rates, and then segmenting each of the different bit rate segments. The media segment length may be a predetermined size and duration, for example, between 2 and 10 seconds. The client or user's device 803 may include a player 960 to use the ABR advantageously to switch among the different bit rate segments, thereby locating the segments that correspond best to the bandwidth. The player 960 of the device 803 may be configured to play the linear and non-linear content media file(s) 850, 851 to create an optimum user experience.

In some examples, the device 803 may have application software 956 loaded in memory of the device 803, e.g., a set top box or satellite DVR receiver supplication software. In establishing a recording, the device 803 may check with the gatekeeper 963 to determine the user's privileges, the user's metadata, the lineup data, may perform a restrictions check such as passing an authorization token, and also may be used to purchase media content. The application software 956 may be configured as APIs. The application software 956 may be configured with a browser 957, a DVR 844, an authorization token or restriction checker 958, a DRM module 959, a content media player 960, and so on. The application software 956 may be adapted to log in to a gatekeeper 963 module of the resource manager 840. The gatekeeper 963 may also utilize APIs for various of the subscriber data services for policies of acquisition, persistence, and consumption for the media content that may be established by the back office 852. The gatekeeper 963 may be used in recording linear 851 and non-linear 850 media content including a lineup API 964, a login API 965, a playback API 966, and a purchase API 967. The digital recording functionality may be configured to pull ABR segments by assembling media segments to create a temporal viewing experience (such as time shifting) by reassembling the segments into the original order of the content program being viewed at an alternate time from the original airdate of the program. Any pulled media segments may be delivered to the device 803 by resource manager 840 when the device 803 makes an active request to retrieve those segments from the CDN 847.

The scheduler service 976 may be utilized by the system 800 and may include a scheduler API 968 and a scheduler database 970. The scheduler service 976 may operate in connection with a resource manager 840 to create program schedule information, such as by providing a catalog of media content data to display to the user including program schedule information at a predetermined time in response to the user communicating a selection to the resource manager 840. The scheduler service 976 may be configured to communicate with the resource manager 840, the device 803 of the user, a gatekeeper 963 for effectuating policies associated with the user and/or user's subscription, and a catalog service 971. The user may use the scheduler service 976 to specific channels to view from the guide or line-up displayed, user privileges, and other settings (e.g., such as DVR settings and preferences default DVR scheduling settings. The scheduler service 976 may check with the gatekeeper 963 for authentication, entitlement check, and other account data for the particular user. The catalog service 971 may be for providing metadata information about the media content that is stored in a metadata database 972 and with search capabilities using a search database 973. The catalog service 971 may be implemented in a software program, a catalog API 974, and so on. Scheduling of the recording of the media segments may occur locally, via a cloud/server side program scheduler, and so on. The digital recording functionality of pulling ABR segments may be utilized to reduce system overhead in the delivery to the device of the subscriber or user. Moreover, such resources may be utilized for other functions such as, for example, forming multiple ABR segments of the highest higher resolution on the ingestion of high bit rate video.

In some examples, the system 800 may be configured to transfer HLS segments of media content in an ABR manner across the CDN 847 from the video core 849 to the video edge 845 closest to the client device 803. For a movie, video or broadcast, frames and/or file information of the content media data may be stored in a manifest file. Frames and/or file information of the content media data may be sequenced in a predetermined order based on time.

In various implementations, a system for providing media content to a subscriber of an on-demand service may include a CDN configured to ingest from a direct linear and/or non-linear source the media content, the CDN adapted to package the media content into one or more ABR segments in a predetermined encoded protocol; a resource manager configured to pull one or more ABR segments on-demand for the subscriber, the resource manager adapted to use a manifest file associated with the media of content in the one or more adaptive bit rate streams, the manifest file containing profiles and attributes of the media content; a back office system configured to set for the subscriber; a digital rights management policy for viewing the media content based on obligations to a content owner; and a persistence right on copying the media content based on obligations to a content owner to a single copy for the viewing by the subscriber. The resource manager may cooperate with the back office system so as to permit viewing of the single copy the media content by the subscriber independent of the subscriber's location.

In some examples of such an implementation, the resource manager may maintain the digital rights management policy for viewing the media content in the manifest file. In other examples, the back office system may register one or more devices of the subscriber, and the resource manager may cooperate with the back office system so as to permit viewing of the single copy of the media content for the subscriber. In various examples, the resource manager may allow the subscriber to view the media content outside of the home.

In some implementations, a method of providing media content to a subscriber of an on-demand service includes receiving a request for the media content from the subscriber by a resource manager in a CDN configured to ingest from a direct linear and/or non-linear source the media content, the CDN adapted to package the media content into one or more ABR segments in a predetermined encoded protocol;

determining a DRM policy for viewing the media content based on obligations to a content owner; pulling the one or more ABR segments using the resource manager for the subscriber when the token passes a restrictions check with the persistence policy so as to allow the copying of the media content to the device registered for the particular subscriber; and displaying the one or more ABR segments of the media content independent of the subscriber's location using the resource manager for the subscriber on the registered device when the token passes the restrictions check with the DRM policy so as to allow the viewing of the media content on the device registered for the particular subscriber. In some cases of such implementations, determining a DRM policy for viewing the media content based on obligations to a content owner may be performed by identifying a DRM policy from a manifest file associated with the media content in the one or more adaptive bit rate streams, the manifest file containing profiles and attributes of the media content for viewing the media content based on obligations to a content owner; identifying a device policy from a back office system in the CDN for a device registered using a token for the subscriber with the resource manager and the back office system, the device policy attributed to the device registered for the particular subscriber; and identifying a persistence policy for copying the media content based on obligations to a content owner.

As described above and illustrated in the accompanying figures, the present disclosure relates to content rights management in a content provider network that is independent of the geolocation of content access devices used to access content. A content provider may receive a request for content from a content access device and determine whether or not the content access device is registered to an account associated with a geolocation. If so, the content provider may provide access. In this way, users may be able to use devices to access content allowed to their account in a way that may be independent of geolocation while content providers may be able to ensure geolocation restrictions for content are observed. This may provide a more flexible system for users while allowing content providers to fulfill obligations to content owners and/or otherwise control provided content.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device for providing geolocation independent content rights management, comprising:
a non-transitory storage medium; and
a processing unit that executes instructions stored in the non-transitory storage medium to:
receive a request for content from a content access device;
determine that the content access device is registered to an account associated with an account location;
determine a first set of access rights that is associated with the account location;
determine a second set of access rights using an actual location of the content access device that is other than the account location, the second set of access rights:
being a subset of rights that would be granted based on location if the actual location were the account location; and
including at least one right in addition to the first set of access rights;
provide access to the content when the first set of access rights or the second set of access rights enables access to a single instance of the content and the processing unit determines that a copy of the content is not stored on a second content access device registered to the account; and
before providing access to the content, lock the copy on the second content access device without removing the copy when:
1) the first set of access rights or the second set of access rights enables the access to the single instance of the content; and
2) the processing unit determines that the copy of the content is stored on the second content access device.

2. The electronic device of claim 1, wherein the processing unit:
receives a registration request indicating the content access device;
identifies the account; and
registers the content access device to the account.

3. The electronic device of claim 2, wherein the processing unit receives the registration request based on communication between the content access device and an additional content access device already associated with the account.

4. The electronic device of claim 3, wherein the processing unit receives the registration request from the additional content access device.

5. The electronic device of claim 1, wherein the processing unit transmits a token to the content access device as part of registering the content access device to the account.

6. The electronic device of claim 1, wherein the account is a content provider subscription account.

7. The electronic device of claim 1, wherein the content is on-demand video content.

8. An electronic device for providing geolocation independent content rights management, comprising:
a non-transitory storage medium; and
a processing unit that executes instructions stored in the non-transitory storage medium to:
receive a request for content from a first content access device, the request including a token;
verify the token indicates the first content access device is registered to an account associated with a geolocation;
when the processing unit determines that a copy of the content is not stored on a second content access device registered to the account and a digital rights management policy indicates the account is allowed to access the content, provide access to the content; and
when the processing unit determines that the copy of the content is stored on the second content access device and the digital rights management policy indicates the account is allowed to access the content, disable presentation of the copy of the content by the second content access device without impairing other operations of the second content access device before providing the access to the content.

9. The electronic device of claim 8, wherein the processing unit receives the token from the first content access device.

10. The electronic device of claim 8, wherein the processing unit retrieves the token from the non-transitory storage medium using an indicator transmitted by the first content access device.

11. The electronic device of claim 8, wherein the digital rights management policy specifies obligations a provider of the content owes to an owner of the content.

12. The electronic device of claim 8, wherein the token is encrypted.

13. The electronic device of claim 8, wherein the content is broadcast video content.

14. The electronic device of claim 8, wherein the access to the content is provided by pulling one or more adaptive bit rate segments.

15. An electronic device for providing geolocation independent content rights management, comprising:
a non-transitory storage medium; and
a processing unit that executes instructions stored in the non-transitory storage medium to:
receive a request for content from a first content access device;
determine whether the first content access device is registered to an account associated with a geolocation;
when the processing unit determines that a copy of the content is not stored on a second content access device registered to the account and digital rights management and persistence policies indicate the account is allowed to access the content, provide access to the content; and
when the processing unit determines that the copy of the content is stored on the second content access device and the digital rights management and persistence policies indicate the account is allowed to access the content, lock the copy of the content on the second content access device without removing the copy of the content before providing the access to the content.

16. The electronic device of claim 15, wherein the digital rights management and persistence policies restrict access to the content based on geolocations including the geolocation.

17. The electronic device of claim 15, wherein the processing unit revokes access to the content by the first content access device before allowing an additional request for the content from a content access device other than the first content access device.

18. The electronic device of claim 15, wherein the processing unit denies an additional request for the content from a content access device other than the first content access device when the access to the content by the first content access device has not yet been revoked.

19. The electronic device of claim 15, wherein the processing unit provides the access to the content by the first content access device when the first content access device is located other than at the geolocation.

20. The electronic device of claim 15, wherein the processing unit provides the access to the content by the first content access device independent of a location of the first content access device.

* * * * *